US 6,567,188 B1

(12) United States Patent
Thompson et al.

(10) Patent No.: US 6,567,188 B1
(45) Date of Patent: May 20, 2003

(54) SYSTEMS AND METHODS FOR NON-COPLANAR CALIBRATION OF A SCANNING SYSTEM

(75) Inventors: David M. Thompson, Fairport, NY (US); Ed C. Savage, Webster, NY (US); John I. Howard, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/449,349

(22) Filed: Nov. 24, 1999

(51) Int. Cl.7 .................................................. H04N 1/40
(52) U.S. Cl. ...................... 358/461; 358/474; 358/497; 358/406
(58) Field of Search ................................ 358/406, 504, 358/461, 475, 509, 483, 464, 471, 497, 401

(56) References Cited

U.S. PATENT DOCUMENTS

| 4,675,745 A | * | 6/1987 | Suzuki ........................ 358/483 |
| 4,691,240 A | * | 9/1987 | Kurusu et al. .............. 358/464 |
| 4,903,144 A | | 2/1990 | Stefanik et al. ............. 358/461 |
| 5,563,723 A | | 10/1996 | Beaulieu et al. ............ 358/461 |
| 6,016,209 A | | 1/2000 | Motosugi .................... 358/537 |

* cited by examiner

Primary Examiner—Cheukfan Lee
(74) Attorney, Agent, or Firm—Oliff & Berridge, PLC.

(57) ABSTRACT

A non-coplanar calibration system exists when the calibration reference plane is offset from a document plane. Due to size, shape, or other factors attributable to a scanning system, it may not be feasible to place the calibration reference plane on the document plane, i.e., the platen glass. Lamp-fall off represents an effect that occurs as you get closer to the ends of the lamp and light energy is diminished. The profile difference between the calibration plane and the document plane in a non-coplanar system can be corrected for on a pixel by pixel basis. Illumination fall off due to the change in the distance from calibration plane to the document plane represents the main effect that must be corrected for. Also, the platen glass must be taken into account. A single calibration correction factor can be applied to each CCD element in a scanning system to account for the shift from calibration plane to document plane. Or a lumped parameter single calibration correction factor comprised of the average profile shift and the illumination shift can be used.

8 Claims, 4 Drawing Sheets

SYSTEMS AND METHODS FOR NON-COPLANAR CALIBRATION OF A SCANNING SYSTEM

BACKGROUND OF THE INVENTION

1. Field of Invention

This invention relates to systems and methods for calibration of a document scanning system.

2. Description of Related Art

Due to instability in the scanning system illumination process, calibration of a document scanning system to a reference background is needed to obtain repeatable output. The calibration of a scanning system enables the system to properly differentiate from white and black areas. Normally, the calibration is done with reference to a document plane because the document plane represents what the machine is going to see. Therefore, a reference surface is typically provided on the document plane, e.g., a platen glass, for a calibration strip or label.

In a typical coplanar system, the calibration of the document scanning system is normally done upon powering up the system. A coplanar system exists when there is a calibration reference plane on the same plane as the document plane. For example, when a white calibration strip or label is attached to the top surface of a document plane. In this example, the white calibration strip or label is used for determining a level of whiteness. During the calibration in a coplanar system, a scanning element, e.g., charged-coupled devices (CCD's), is positioned under the white calibration strip. The CCDs in the scanning system is able to identify the whiteness in the calibration strip and would wash out areas in a document corresponding to the level of whiteness so that it comes out white. However, document scanning systems need to be periodically calibrated because of drifts in lamp intensity and line voltage.

SUMMARY OF THE INVENTION

A non-coplanar calibration system exists when the calibration reference plane is offset from a document plane. Due to size, shape, or other factors attributable to a scanning system, the calibration reference plane may be unable to be placed on the document plane, i.e., the platen glass. In a non-coplanar calibration system, one must account for, primarily the difference in distance from the lamp at the calibration plane verses the document plane, and the reflectance of light through the platen glass during a copying process since a certain amount of light that goes through the platen glass can be lost due to the offset of the calibration plane. In addition, a document scanning system that uses full length mirrors and/or lamps as part of the assembly to scan the original document may experience lamp fall-off as the document approaches the ends of the lamp. For an infinitely long illumination source, light incident on a plane is inversely proportional to the normal distance from the source to the plane.

Lamp fall-off represents an effect that occurs as you get closer to the ends of the lamp. Light energy falls-off at the end locations of the lamp and as a result shadows can appear on the printed copy of the scanned document. As you move the calibration plane away from the document plane, which is usually the same plane that the original document is placed on, the lamp fall-off is more pronounced.

The methods and systems of this invention provides a calibration plane that is offset from the document plane in an image data source system and the system compensates for lamp fall-off.

This invention separately provides systems and methods that use a single calibration correction factor to account for the shift from calibration plane to document plane.

It should be appreciated that the systems and methods according to the invention are applicable to a wide variety of image data source systems. Thus, while the systems and methods in accordance with the invention may be directed to the calibration of a digital scanning system, it should be recognized that any non-coplanar system may be calibrated in accordance with the invention. Further, it should be recognized that the systems and methods described herein can be used in conjunction with various other processes and systems.

In the various exemplary embodiments of the systems and methods according to this invention, an image data source system, e.g., a scanner, with a document plane, e.g., a platen glass of various shapes and sizes, is provided whereby various limitations in the positioning of the calibration reference surface may exist. For example, compactness of design of a scanning system may inhibit the positioning of the calibration reference surface on the platen glass. Alternatively, there may not be enough surface space for the calibration strip on the document plane. Additionally, the orientation of the platen glass may cause inaccuracies in calibration if a calibration strip is placed thereon. Therefore, if it is desirable or required that the calibration reference surface be placed on a different plane from the document plane, the non-coplanar calibration system and methods of this invention provides calibration wherein at least lamp intensity and lamp fall-off are accounted for.

These and other features and advantages of this invention are described in or are apparent from the following detailed description of this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1A:
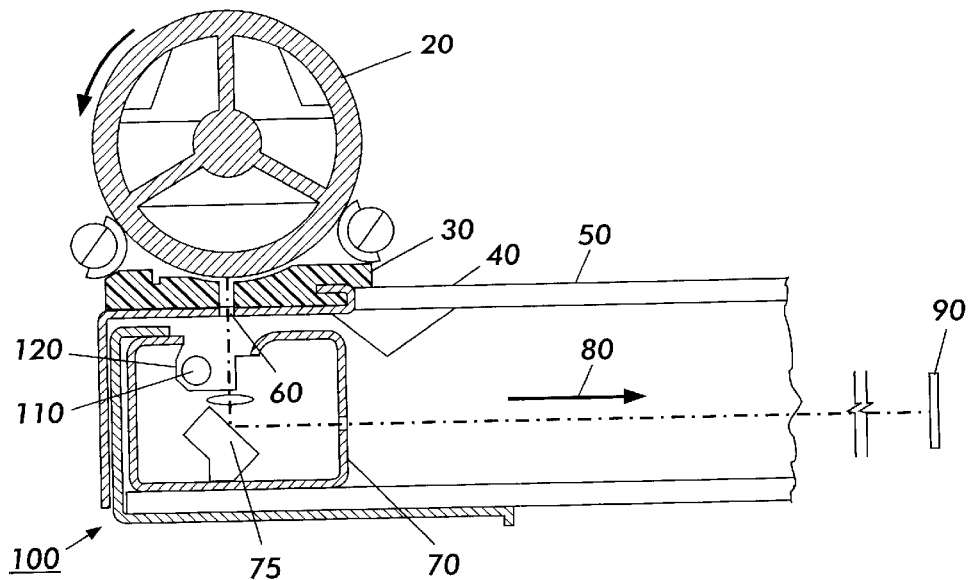
FIG. 1 illustrates a diagram for an exemplary image data source with a non-coplanar calibration system according to this invention.
Figure 1B:
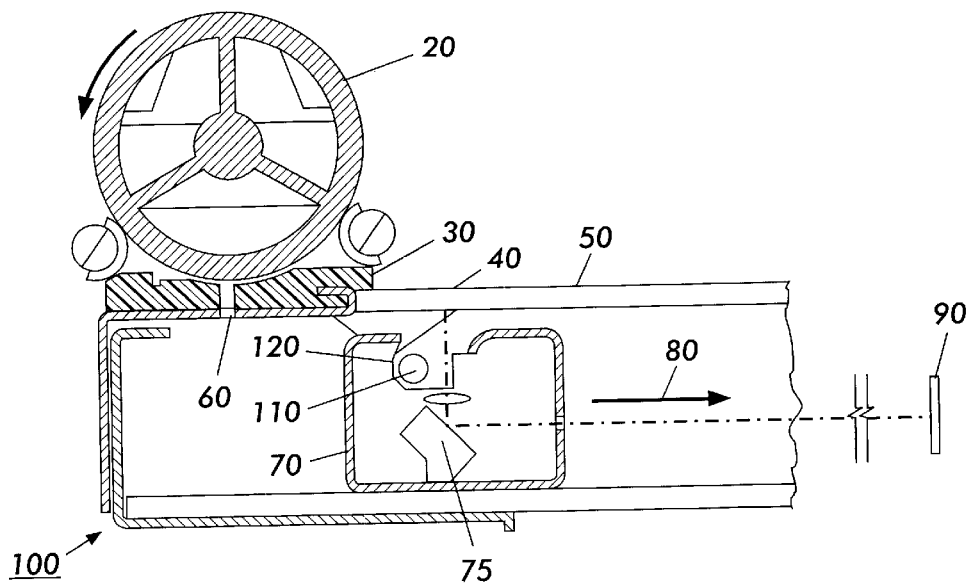

FIGS. 1a and 1b illustrate a diagram for an exemplary image data source 100 with a non-coplanar calibration system. In general, the image data source 100 is any one of a number of different sources, such as a scanner, a digital copier, a facsimile device, or any other known or later developed device that is suitable for generating electronic image data from a hard-copy or printed source. Further, the image data source 100 does not necessarily have to be a single device, but rather may be formed by two or more separate devices. FIGS. 1a and 1B apply to either a scanning CCD, i.e., linear array, or a fixed CCD array, respectively.

The image data source 100 in FIGS. 1a and 1b includes a constant velocity transport roll 20, a document registration edge 30 (DRE), a document plane 40, a calibration plane 50, a CVT glass 60, an imager scan carriage 70, a mirror 75, an imager scan direction 80, a lamp 110, a reflector 120, and a stationary imaging system 90. FIG. 1a shows a fixed illuminator with moving document items 20, 50, 60, 75, 90 and 110. FIG. 1b shows a fixed document arrangement with a moving illuminator 30, 40, 50, 70, 75, 80, 90, 110 and 120. There can be a separate calibration used for each system, i.e., FIG. 1a and FIG. 1b, because the CVT glass 60 is different than the platen glass 40. The system 100 depicts a fixed CCD array but the invention is equally applicable to a scanning CCD array.

The constant velocity transport roll 20 is located, for example, on an automatic document feeder that feeds a document over a platen glass 60 positioned above the lamp 110. The stationary imaging system 90 captures and stores digital data corresponding to the image on the document. The document registration edge 30 is used when the original document is placed on the document plane 40.

The document plane 40 is typically made of platen glass. During the operation of scanners, copiers and other image capturing devices, a document is typically laid on a transparent platen material and is covered by a platen cover. The document is then scanned by the imager scan carriage 70, for example. The imager scan carriage 70 is shown in a parked position in FIG. 1. The direction of the imager scan when the original document is placed on the platen is shown by direction arrow 80.

The calibration plane 50 is vertically offset from the document plane 40. For example, the calibration plane 50 is positioned 5 mm below the document plane 40, however, the calibration plane 50 is not restricted to any particular vertical or horizontal position. The flexibility in location of the calibration plane 50 enables various design architectures for image capturing devices. However, when a calibration plane 50 is offset from the document plane 40, appropriate corrections for shifts in position from the lamp to the document plane 40, secondary illumination from the reflector 110, and other factors related to the reference document need to be addressed.

Figure 2:
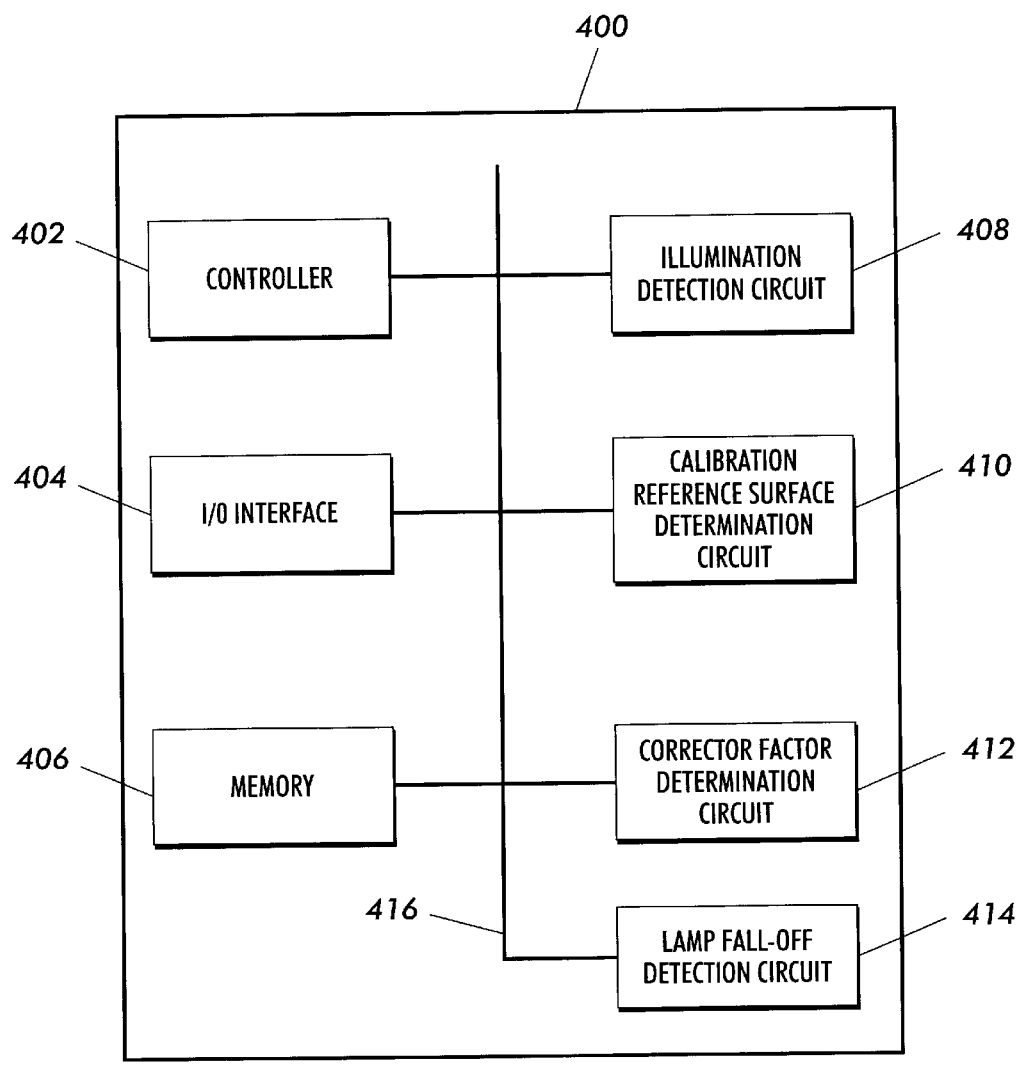
FIG. 2 illustrates a block diagram for an exemplary non-coplanar calibration system according to this invention.

FIG. 2 illustrates a block diagram for an exemplary non-coplanar calibration system 400 according to this invention. The non-coplanar calibration system 400 includes a controller 402, an I/O interface 404, a memory 406, an illumination detection circuit 408, a calibration reference surface determination circuit 410, a correction factor determination circuit 412, and a lamp fall-off detection circuit 414. The above components are coupled together through a control/signal bus 416. While FIG. 2 shows a bus architecture, other hardware configurations may also be possible as is well known in the art.

While FIG. 2 shows the controller 402, the illumination detection circuit 408, the calibration reference surface determination circuit 410, the correction factor determination circuit 412, and the lamp fall-off detection circuit 414 as separate units, the functions performed by these units may be combined or may be further divided among specific processors such as digital signal processors and/or performed by dedicated hardware such as application specific circuits (ASIC) or other hardware implementations integrated into existing printers or copiers, etc., for example.

The illumination detection circuit 408 is used to detect the illumination at the document plane 40 as it relates to the offset calibration plane 50. The illumination at the document plane 40, or the calibration plane 50, is detected, for example, by the illumination detection circuit 408 integrating a source lamp brightness over the length of the lamp source. If the lamp source is not uniform, it is difficult to separate the effect, but it can be approximated.

The controller 402 is used to correct the illumination at the document plane 40 based on results obtained from scanning the calibration plane 50 using the calibration reference surface determination circuit 410. The calibration reference surface determination circuit 410 allows the system to determine whether the calibration plane 50 is offset from the document plane 40. Thereafter, the correction factor determination circuit 412 enables appropriate calibration of a CCD exposure device, not shown, in an image data source 100.

The correction factor determination circuit 412 accounts for any front conjugate shifts from the calibration plane 50 to the document plane 40 due to the offset between the two planes. Each pixel output in the system is adjusted so that the 8 bit gray scale is independent of the position in the fast scan direction. In a system which uses a calibration plane 50 in the document plane 40, $\cos^4 \theta$ fall-off and any illumination non-uniformity is corrected as a single lumped parameter. The lamp fall-off detection circuit 414 is used to detect this lamp fall-off.

However, when the calibration plane 50 is displaced from the document plane 40, several factors must be taken into account. For instance, the average illumination energy shift due to change in distance from a lamp source must be considered. There is also a reflector that creates a second lamp source, not shown. The reflected lamp source is typically located at a different distance from the document plane 40 then from the calibration plane 50. Additionally, an illumination profile shift must be considered. For the illumination profile shift, the lamp source has a finite length that causes the normalized illumination profile $\{E(x)/E(max)\}$ to change shape when the distance between document plane 40 and calibration plane 50 changes.

For the above two effects, e.g., the average illumination energy shift and the illumination profile shift, the governing equation is of the form:

$$E(x)=(K/Y_0)*(((\theta_2-\theta_1)+(0.5*(\sin 2\theta_2-\sin 2\theta_1)))$$

$\theta_1=-\text{Tan}^{-1}(L1+x)$ $\theta_2=\text{Tan}^{-1}(L2-x)$ $Y_0$=Normal distance between lamp and the illumination surface $L_1$=Distance from start of lamp to start of scan (x=0)

$L_2$=Distance from start of scan to end of lamp $K_0$=The relative brightness of the lamp If either shift exceeds the depth of focus, the image is spread across multiple pixels in the CCD element. The system finds the pixel with the highest response, which is usually near the center of the lamp source. The illumination at the document plane 40, or the calibration plane 50, is the result of integrating a source lamp brightness profile over the length of the lamp source. If the lamp source is not uniform, it is difficult to separate the effect, but it is approximated by super-positioned sources. In any case, the pixel correction factor depends on the geometry change, not the profile of the illumination lamp source.

The $\cos^4 \theta$ fall off effect is separately accounted for when generating a pixel correction factor. For example, the front conjugate is about 363 mm. If the calibration plane 50 is offset 5 mm below the document plane 40, a 5 mm shift can yield a $\cos^4 \theta$ value change from 0.844 to 0.840 at the edge of the document, progressing to no difference at the center of the document.

The pixel correction factor is preferably the sum of effects from the average illumination energy shift due to change in distance from the lamp source, the illumination profile shift, and the $\cos^4 \theta$ fall off effect. Because the calibration plane 50 is closer to the lamp source at its offset position, the illumination in this position is approximately 30% more than what it would have been had the calibration plane 50 been located on the document plane 40. The profile shift creates an additional error of about 1%, so it is ignored. If the profile shift was significant, a correction could be applied on a pixel to pixel basis.

When performing the CCD calibration process to identify either a white or a black area, an additional 30% of illumination should be added to each pixel to arrive at the calibration level needed at the document plane 40 when dealing with an offset at the calibration plane 50. There are over 3,800 CCD elements, for example, within a image data source system 100, all of which needs to be calibrated. The image data source system 100 may have two calibration strips 50, one white and one black. If so, the scan values found in the ranges of the white strips and the black strips are identified accordingly.

Figure 3:
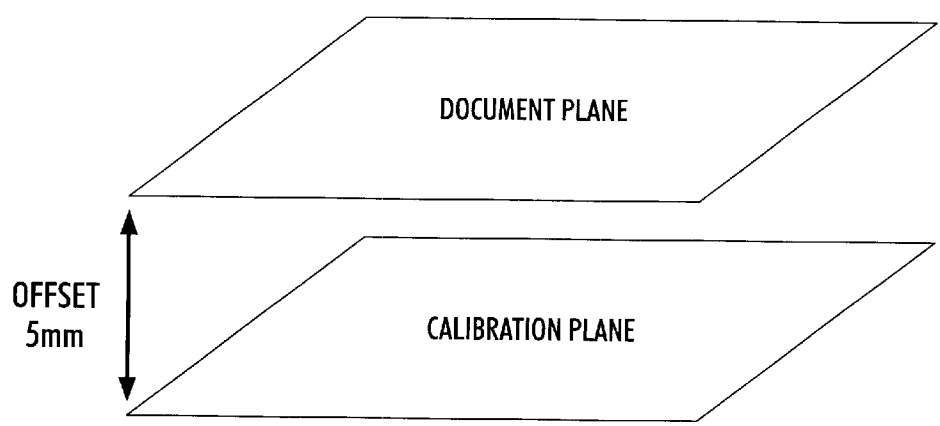
FIG. 3 illustrates a diagram of one exemplary embodiment of a non-coplanar calibration area according to this invention.

FIG. 3 illustrates a diagram of one exemplary embodiment of a non-coplanar calibration area according to this invention. In FIG. 3, a remote calibration plane 50, e.g., below the plane of focus of the scanning array, from the document plane 40 is provided. This remote calibration plane 50 is placed 5 mm below the document plane 40. However, various locations are provided for the calibration plane 50.

Figure 4:
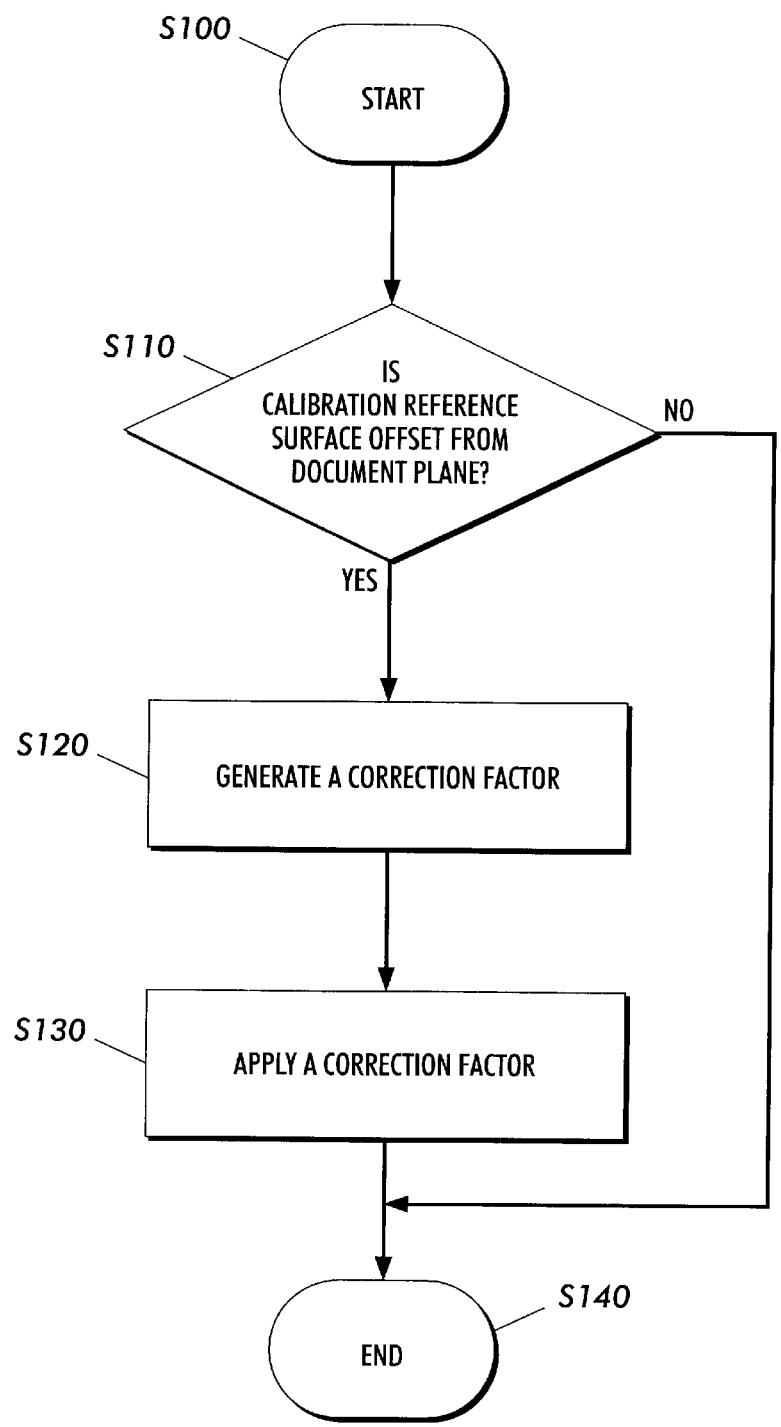
FIG. 4 is a flowchart outlining one exemplary embodiment of a method for calibrating an image data source with a non-coplanar calibration system in accordance with this invention.

FIG. 4 shows a flowchart outlining one exemplary embodiment of a method for calibrating an image data source with a non-coplanar calibration area in accordance with this invention. As shown in FIG. 4, the processing process begins in step S100, and continues to step S110, where a determination is made whether the calibration reference surface is offset from a document plane. This determination is made by the user, automatically, or a combination of both automatically and by user-input.

If, in step S110, the calibration reference surface is determined to be offset from the document plane, control continues to step S120. Otherwise, control jumps to step S140. In step S120, a correction factor is generated, based on the offset value of the calibration plane and other factors, including illumination and lamp fall-off. The control then passes to step S130. In step S130, the correction factor is applied to each CCD element in the system. Control then continues to step 140. In step S140, the control sequence ends.

As shown in FIG. 2, the non-coplanar calibration system is preferably implemented either on a single program general purpose computer or separate program general purpose computer. However, the non-coplanar calibration system can also be implemented on a special purpose computer, a programmed microprocessor or microcontroller and peripheral integrated circuit element, and ASIC, or other integrated circuit, a digital signal processor, a hardwired electronic or logic circuit such as a discrete element circuit, a programmable logic device such as a PLD, PLA, FPGA, PAL, or the like. In general, any device, capable of implementing a finite state machine that is in turn capable of implementing the flowcharts in FIG. 4 can be used to implement the non-coplanar calibration system.

The controller need not be a single contiguous entity. Instead, the controller can be implemented, at least in part, as a plurality of general purpose data processors and/or a single special purpose integrated circuit (e.g., ASIC) or an array of ASICs each having a main or central processor section for overall, system-level control, and separate sections dedicated to performing various specific computations, functions and other processes under the control of the central processor section.

Similarly, the memory device can be any known structural apparatus for indefinitely storing the image data. The memory may also store any necessary control programs and/or data required by the image data source system 100. Thus, the memory can be implemented using static or dynamic RAM, a floppy disk and disk drive, a writable optical disk and disk drive, a hard disk and disk drive, flash memory, or the like. The memory can also include read only memory, including PROMs, EPROMs, EEPROMs, a CD-ROM and disk drive, or the like.

Furthermore, the disclosed method may be readily implemented in software using object or object-oriented software development environments that provide portable source code that can be used on a variety of computer or workstation hardware platforms. Alternatively, the disclosed the non-coplanar calibration system may be implemented partially or fully in a hardware using standard logic circuits or VLSI design. Whether software or hardware is used to implement the systems in accordance with this invention is dependent on the speed and/or efficiency requirements of the system, the particular function, and the particular software or hardware systems or microprocessors or microcomputer systems being utilized. The non-coplanar calibration system and methods described above, however, can be readily implemented in hardware or software using any known or later-developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this case, the methods and systems of this invention can be implemented as a routine embedded on a personal computer such as Java® or CGI script, as a resource residing on a server or graphics work station, as a routine embedded in a dedicated search control system, web browser, web TV interface, PDA interface, or the like. The non-coplanar calibration system can also be implemented by physically incorporating the system and method into a software and/or hardware system, such as the hardware and software of a graphics workstation or dedicated search control system.

The invention has been described with particularity in connection with the embodiments. However, it should be appreciated that many alternatives, modifications and variations may be made to the embodiments of the invention without departing from the spirit and inventive concepts contained herein. Accordingly, the present invention is intended to embrace all such alternatives, modifications, and variations.

What is claimed is:

1. A method for calibrating an image data source having a plurality of CCD elements with reference to a calibration reference surface, the method comprising:

determining where the calibration reference surface is offset from a document plane using a controller and based on that offset, determining an offset value;

generating a correction factor based on the offset value; and applying the correction factor to each CCD element in the image data source, wherein the correction factor corrects lamp fall-off and illumination non-uniformity at the document plane.

2. The method of claim 1, wherein the applying step comprises adding at least 30% more illumination to each CCD element.

3. The method of claim 1, wherein generating the correction factor step comprises taking into consideration an average illumination energy shift due to a change in distance from the document plane.

4. The method of claim 1, wherein generating the correction factor step comprises taking into consideration an illumination shift.

5. A system for calibrating a scanning system having a plurality of CCD elements with a non-coplanar calibration system, the system comprising:
   a document plane;
   a calibration plane remote from the document plane; and
   a controller, the controller determining an offset value of the calibration plane from the document plane, generating a correction factor based on the offset value, applying the correction factor to each CCD element in the scanning system, wherein the correction factor corrects for lamp fall-off and illumination non-uniformity at the document plane.

6. The system of claim 5, wherein the controller applies at least 30% more illumination to each CCD element.

7. The system of claim 5, wherein the controller takes into consideration an average illumination energy shift due to a change in distance from the document plane when generating the correction factor.

8. The system of claim 5, wherein the controller takes into consideration an illumination shift when generating the correction factor.

* * * * *